May 14, 1935.  H. L. ZIMMERMAN  2,001,174
SKATE WHEEL
Filed Aug. 10, 1933
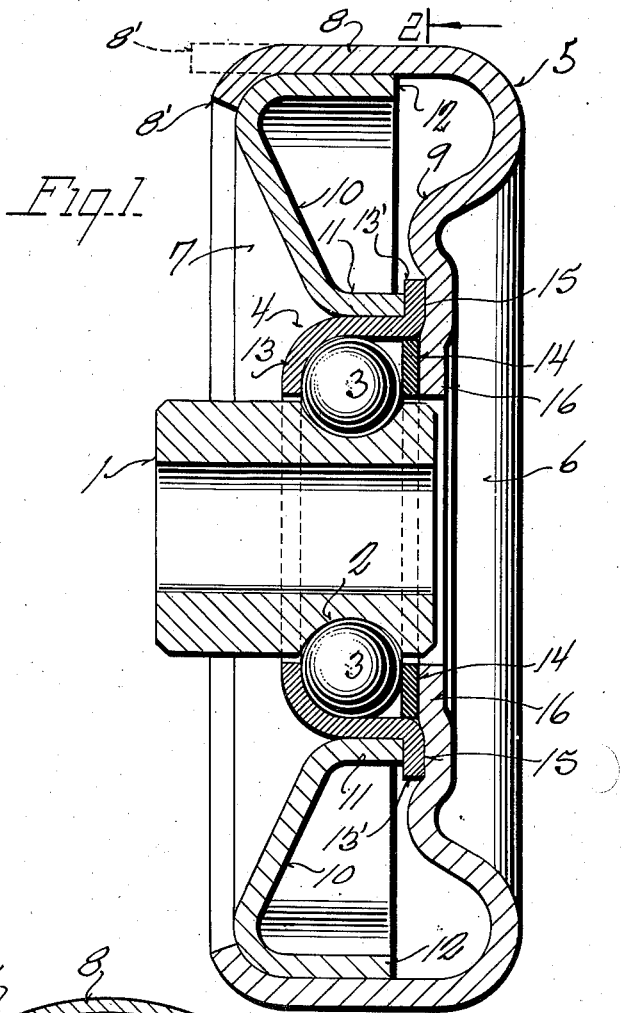
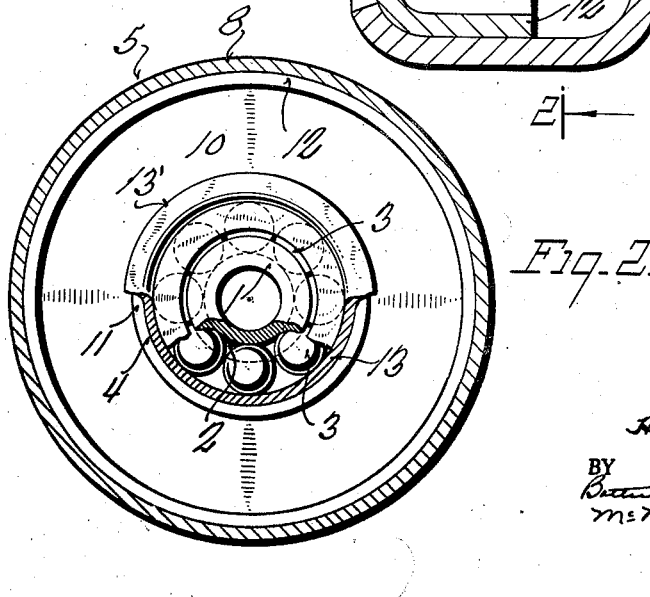
INVENTOR.
Herbert L. Zimmerman
BY
ATTORNEYS Patented May 14, 1935

2,001,174

UNITED STATES PATENT OFFICE 2,001,174

SKATE WHEEL

Herbert L. Zimmerman, Milwaukee, Wis., assignor to Globe-Union Mfg. Co., Milwaukee, Wis., a corporation of Wisconsin Application August 10, 1933, Serial No. 684,491

7 Claims. (Cl. 208—181)

This invention relates to an improvement in wheels well adapted for use on roller skates, although also capable of advantageous use in various other fields as, for example, as a conveyor roller, caster or the like.

Among the objects of the invention are to provide a wheel of this character which is susceptible of economical and quantity production, yet is light in weight, free running, attractive in appearance and sturdy and durable in use.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a view in cross section taken on a diameter of the wheel and showing a wheel embodying the invention, parts being shown in elevation for the sake of illustration; and Figure 2 is a similar view taken, however, in the plane of line 2—2 of Figure 1.

Referring to the drawing, it will be seen that the wheel comprises in general a hub or bearing sleeve 1 having formed therein the inner raceway 2 for a single row of ball bearings 3.

An outer raceway for the ball bearings 2 is provided by means designated generally at 4 and carried by a wheel body designated generally at 5, as will hereinafter more clearly appear.

The wheel body 5 comprises a pair of cupped sections 6 and 7 pressed or drawn into their respective cupped formations in a punch press or the like prior to their assembly. The sections 6 and 7 may be constructed of any suitable metal but ordinarily mild steel is employed. The outer section 6 has a tread-forming portion 8 and a corrugated side plate 9. The inner section 7 has an inclined body portion 10 and inner and outer flanges designated at 11 and 12.

The means 4 providing the outer raceway for the ball bearings 2 comprises a single ball bearing cup 13 of appropriately hard metal and a cooperable thrust washer 14 of similar metal. The cup 13 has a flange 13', which, in the assembly, flatly engages and fits in an annular depression or seat 15 formed in the side plate 9 of section 6 and is held firmly against such seat by the engagement therewith of the edge of the flange 11 of section 7. The flange 11 is press fit on the body of the bearing cup 13 to aid in the secure and precise positioning of the cup 13. The thrust washer 14 which is disposed at and closes the open end of the cup 13 abuts flatly against the portion 16 of the side plate 9, the portion 16 being located inwardly of the seat or depression 15 and providing an abutment for the washer 14. The corrugation of the side wall 9 and the pressing of the depression or seat 15 therein work hardens this side plate and thereby reduces flexion thereof to insure proper positioning of the thrust washer in the assembly.

After the parts have been assembled, the edge 8' of the tread-forming portion 8 is pressed or formed or crimped over on the juncture of the flange 12 and body portion 10 of the section 7 to secure the parts of the wheel properly assembled.

In producing the wheel the sections 6 and 7 are first pressed or drawn into the shape shown and with the edge 8' positioned as shown in dotted lines. The cup 13 is then inserted in the flange 11 of the section 7. The cup 13 with section 7 attached is then so positioned on the sleeve 1 with respect to its inner raceway 2 as to permit the ball bearings to be dropped into place whereupon the sleeve 1 is moved into its operative position and the washer 14 and section 6 are assembled therewith. The sections 6 and 7 are then pressed together and the edge 8' formed down to provide the assembly shown in Figure 1.

With a skate wheel constructed in the manner described, the bearing clearances can be controlled with the desired precision and yet the structure, while simple and comparatively inexpensive to produce, is closely organized and durable and highly satisfactory in use. Economy in production is realized as the result of employing but one bearing cup. The cupped members which form the body of the wheel are rigidly and securely interlocked in the assembly and fixedly maintain the ball bearing retaining cup and its cooperable washer in position. The corrugated formation of the side wall 9 of the cupped member 6 requires a working of the metal with the result that this body portion is work-hardened and will not flex. The cupped member 7 is a press fit in the member 6 and is secured therein by the bent edge 8' and this, together with the inclination of its body portion 5 and the engagement of the flange 11 with the ball bearing retaining cup, not only firmly fixes the several parts in proper position but also reinforces and strengthens the wheel structure generally.

It is to be understood that, if desired, the washer 14 may be omitted and the parts dimensioned so that the ball bearings 3 engage the inner surface of the portion 16. In such event the advantage of using the washer would be lost but the advantages flowing from the other structural features would be retained.

While I have shown and described a construction in which the invention may be embodied, it is to be understood that the construction shown has been selected merely for the sake of illustration and that various changes in the size, shape and arrangement of the parts may be made without departing from the spirit of the invention or the scope of the subjoined claims.

The invention claimed is:

1. A wheel comprising a cupped member having a flange providing the tread of the wheel and a corrugated web providing the body of the wheel, said web having an annular depression on its inner surface providing a seat, a ball bearing retaining cup having an annular flange fitted in said seat, a complementary cupped member interfitted and interlocked with said first named member and having an inner flange bearing against said cup with its edge abutting the flange thereof to retain the cup in position.

2. A wheel comprising an outer cupped member having a portion providing a tread and having a web providing a side wall of the wheel, an inner cupped member interlocked with said outer cupped member and having an inclined body portion provided with an outer flange engaged with said tread and also provided with an inner inturned flange, said web having a seat therein opposed to said inner flange, and a ball bearing retaining cup having a portion fitting in said seat and held therein by said inturned inner flange.

3. A wheel comprising an outer cupped member having a portion providing a tread and having a web providing a side wall of the wheel, an inner cupped member interlocked with said outer cupped member and having an inclined body portion provided with an outer flange engaged with said tread and also provided with an inner inturned flange, said web having a seat therein opposed to said inner flange, a ball bearing retaining cup having a portion fitting in said seat and held therein by said inturned inner flange, said seat being located outwardly of the inner peripheral edge portion of said web, a thrust washer abutting said inner peripheral edge portion and coacting with said cup to form a raceway and ball bearings in said raceway.

4. A wheel comprising an outer cupped member having a portion providing a tread and having a web providing a side wall of the wheel, the inner portion of said web being corrugated to work harden the same and to provide a seat and an abutment, said inner portion having its mean plane substantially parallel to the wheel plane, raceway forming elements fitted against said seat and abutment and an inner cupped member having an inwardly inclined body portion provided with an outer flange telescoped within said tread portion, said tread portion being formed over said inner cupped member to secure the same in position, said inclined body portion having an inner inturned flange engaging one of said raceway forming elements to secure the same in position against said seat and abutment and ball bearings in said raceway.

5. A wheel comprising interfitted and interlocked cupped members providing the tread and body of the wheel, one of said cupped members having a web, a portion of which provides a seat and an abutment and has its mean plane substantially parallel to the wheel plane, raceway forming elements fitted against said seat and abutment, one of said cupped members having an inturned flange engaging one of said raceway forming elements to secure the same in position against said seat and abutment, and a single row of ball bearings operating in the raceway formed by said elements.

6. A wheel comprising a cupped member having a flange providing the tread of the wheel and a corrugated web providing the body of the wheel, said web having a seat on its inner surface, a ball bearing retaining cup located by said seat, a complementary cupped member interfitted and interlocked with said first-named member and having an inturned flange operating to retain the cup in position against its seat.

7. A wheel comprising interfitted and interlocked cupped members providing the tread and body of the wheel, at least one of said members having a flat annular inner peripheral edge portion, a single bearing retaining cup confined by said members, and a flat washer operatively restrained in said cup by said peripheral edge portion, said cup and washer defining a raceway.

HERBERT L. ZIMMERMAN.